United States Patent [19]

Neko

[11] Patent Number: 4,805,112

[45] Date of Patent: Feb. 14, 1989

[54] OPERATING CONDITION SETTING METHOD FOR INJECTION MOLDING MACHINE

[75] Inventor: Noriaki Neko, Hino, Japan

[73] Assignee: Fanuc Ltd., Kawasaki, Japan

[21] Appl. No.: 193,219

[22] PCT Filed: Nov. 22, 1985

[86] PCT No.: PCT/JP85/00650

§ 371 Date: Jul. 23, 1986

§ 102(e) Date: Jul. 23, 1986

[87] PCT Pub. No.: WO86/03162

PCT Pub. Date: Jun. 5, 1986

Related U.S. Application Data

[63] Continuation of Ser. No. 890,855, Jul. 23, 1986, abandoned.

[30] Foreign Application Priority Data

Nov. 24, 1984 [JP] Japan .................... 59-247013

[51] Int. Cl.⁴ .............................. B29C 45/76
[52] U.S. Cl. ..................... 364/476; 364/191
[58] Field of Search ................ 364/188–192, 364/167–171, 146, 474, 475, 476

[56] References Cited

U.S. PATENT DOCUMENTS 4,674,053 6/1987 Bannai et al. ................ 364/476

FOREIGN PATENT DOCUMENTS 148948 7/1985 European Pat. Off. ........... 364/188
8203704 10/1982 PCT Int'l Appl. ................ 364/188
8403960 11/1984 PCT Int'l Appl. ................ 364/188

Primary Examiner—Allen MacDonald
Attorney, Agent, or Firm—Staas & Halsey

[57] ABSTRACT

An operating condition setting method for an injection molding machine, which can variably set respective operating conditions for an injection molding operation of an injection molding machine without rewriting a numerical control program for controlling the injection molding operation.

The numerical control program is formed using macro parameters which describe the respective operating conditions. The set values of the respective operating conditions are set for corresponding macro parameters. The set values are stored at predetermined addesses in a memory (4) which are assigned to the macro parameters. During injection, the corresponding macro parameters in the program are read out of memory (4) so that the machine is controlled in accordance with the set values.

2 Claims, 2 Drawing Sheets

OPERATING CONDITION SETTING METHOD FOR INJECTION MOLDING MACHINE

This is a continuation of co-pending application Ser. No. 890,855 filed on July 23, 1986, now abandoned.

BACKGROUND OF THE INVENTION

1. Field of the Invention

The present invention relates to a method for setting various operating conditions of an injection molding machine.

2. Description of the Related Art

In an injection molding machine, various operating conditions, which accompany an injection molding process, such as a mold opening limit position, a mold contact position, a mold moving speed, a position for changing the mold moving speed, an eject start position, a core set position, a core pulling position, an injection speed, and a switch position for the injection speed must be set. Conventional injection molding machines control this injection molding process by a program describing set values of these operating conditions. Therefore, when these conditions are changed, the program itself must be altered, and a new program must be created.

SUMMARY OF THE INVENTION

It is an object of the present invention to provide a method of setting operating conditions for an injection molding machine. Such a method can variably set various operating conditions of the injection molding operations simply by changing a mold moving or injection speed, or a switching position thereof without creating a new molding numerical control (NC) unit program, provided that the patterns of the injection molding operations, such as mold clamping and injection processes, are the same, i.e., that the number of switching stages of the mold moving speed for mold clamping or the number of switching stages of the injection speed for the injection is the same.

In order to achieve the above object, according to the present invention, the injection moding machine is controlled by numerical control unit. A numerical control program used for controlling the injection molding operation of the injection molding machine is created for the various operating conditions using macro parameters.

Memory areas corresponding to the macro parameters are respectively predetermined. Meanwhile, values of the operating conditions are set for corresponding macro parameters. The set values of the operating conditions are respectively stored in the memory areas assigned to the corresponding macro parameters.

With this method, the set values of various operating conditions for the respective operations during injection molding can be arbitrarily input to correspond to macro parameters. During operation of the injection molding machine, when a macro parameter in an NC program is read, the corresponding set data is read out and a predetermined injection molding operation is executed in according with the readout data.

In this manner, according to the present invention, the set values of the various operating conditions in the injection molding process can be arbitrarily changed provided that the operating patterns of the injection molding process are the same. Therefore, unlike in a conventional system, since the program itself need not be altered every time the various operating conditions of the injection molding process are changed, an economical effect can be obtained. In addition, an optimum injection molding operating condition can be selected in accordance with the mold or the molding material to be used.

DESCRIPTION OF THE PREFERRED EMBODIMENT

Figure 1:
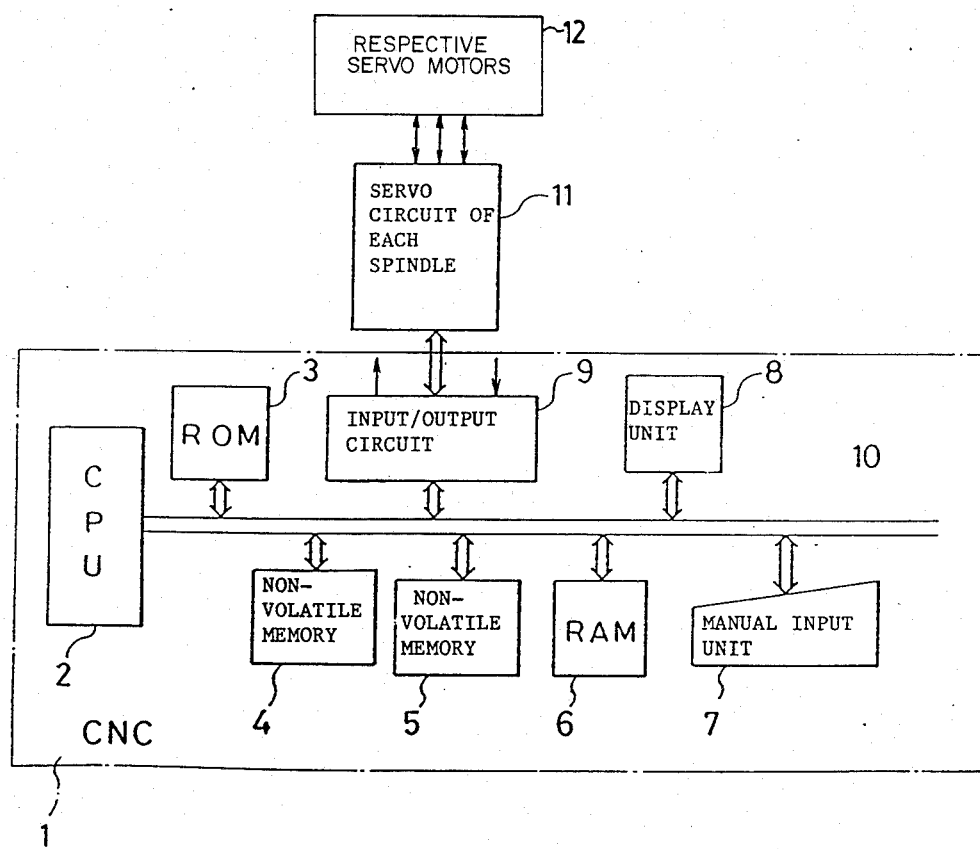
FIG. 1 is a block circuit diagram of a control section of an injection molding machine showing an embodiment of the present invention.

FIG. 1 shows a control section of an injection molding machine. In FIG. 1, reference numeral 1 denotes a computerized numerical controller (to be referred to as a CNC hereinafter) which constitutes the control section; 2 refers to a central processing unit (to be referred to as a CPU hereinafter); 3 refers to a ROM, which stores a a control program for the entire injection molding machine; 4 refers to a non-volatile pattern-storing memory which stores an NC program for executing a predetermined injection molding operation, e.g., a mold clamping process pattern and an injection process pattern; 5 refers to a non-volatile macro parameter storing memory which stores various operating conditions (to be described later) for injection molding as macro parameters; 6 refers to a RAM, which is used for temporarily storing data, some of which is selected by use of the soft keys K1 to K10 (FIG. 2) of a display unit 8; 8 refers to a display unit, which can be a CRT, use of one of the soft keys, which correspond to one of the patterns of the injection molding operation of display unit 8 causes the user determinable various operating conditions of that pattern to be displayed; 7 refers to a manual input unit for manually entering the various operating conditions and various commands which are then stored in the main parameter storing memory 5; and 9 refers to an input/output circuit. The input/output circuit 9 is connected to various sensors (not shown) provided in the injection molding machine, and to either a servo circuit 11 of a servo motor for mold clamping or a servo motor for injection (neither servo motor is shown) in the injection molding machine 12. Note that reference numeral 10 denotes a bus.

Figure 2:
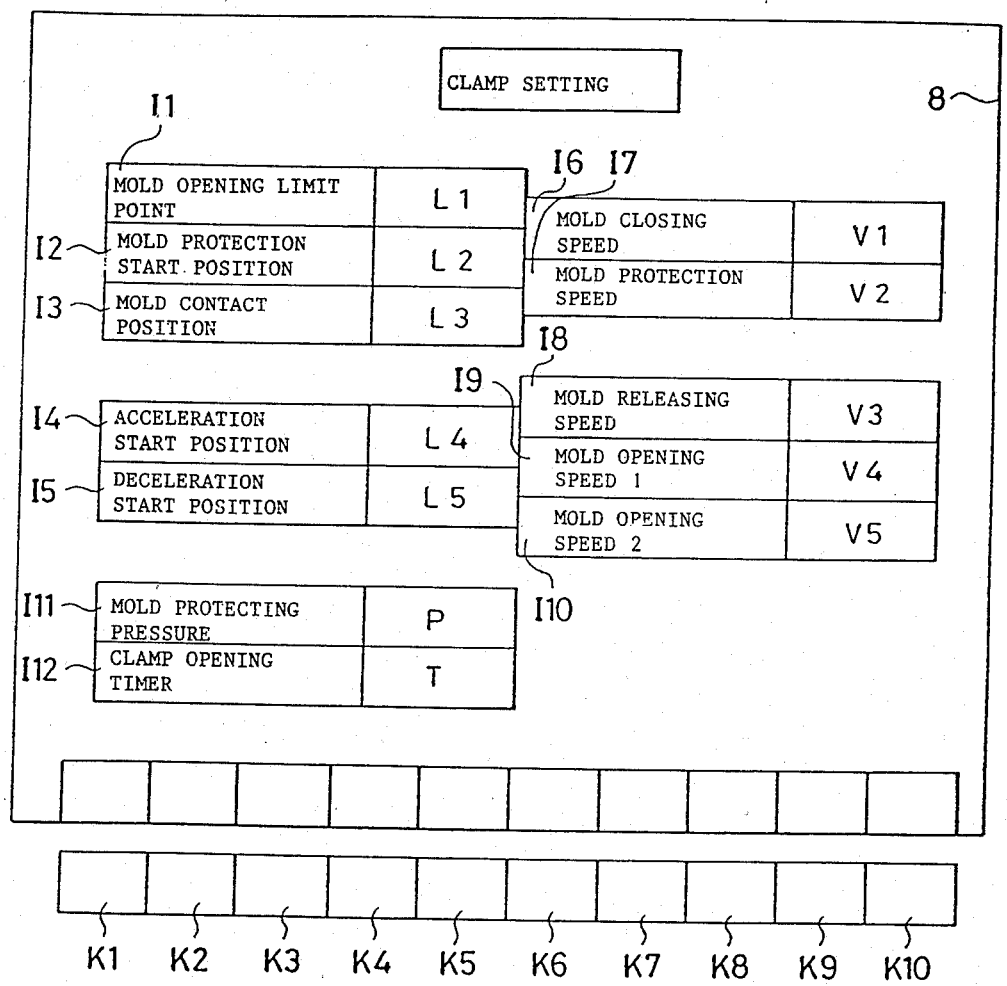
FIG. 2 shows an example of a display screen of a display unit which an operating condition to be set is selected.

FIG. 2 shows a display screen of the display unit 8 on which a clamp (mold opening/closing) setting display is selected and provided. In order to reach the selective display step, the display unit 8 has the soft keys K1 to K10, which are display screen selection keys for selecting the general injection molding processes, such as clamp, injection conditions, ejector or extruder conditions, temperature, sprue break, and so on. When one of the soft keys K1 to K10 is operated to select a required display, for example a display for clamp setting, various operating conditions for that patterned process, which constitutes a part of the injection molding cycle of the program stored in the non-volatile memory 4, are displayed as shown in FIG. 2. The various operating conditions for the clamp process and so on in the molding cycle are described as macro parameters in the NC program stored in the non-volatile memory 4, which executes the injection molding cycle, as will be described later. In order to actually determine the specific the clamp conditions and to execute the clamp process, the values of the macro parameters representing the various corresponding operating conditions are set separately. The operator sequentially selects respective set operating conditions I1 to I12 on the display screen, which are described as macro parameters in the clamp process executing program, through the manual input unit 7, and sequentially sets set values L1 to L5, V1 to V5, P, and T corresponding to the selected set conditions I1 to I12. By this procedure, the actual values of the respective macro parameters are determined. Therefore, the CPU 2 causes the non-volatile macro parameter memory 5 to store, at its predetermined addresses as a predetermined memory area, set values of operating conditions corresponding to the predetermined addresses, i.e., specific values of the macro parameters. In this case, for example, value L1 corresponding to macro parameter 500 is stored at an address of macro parameter 500, value L2 corresponding to macro parameter 501 is stored at an address of macro parameter 501, etc., as shown in the Table below.

| | | |
|---|---|---|
| 500 | ... | L1 |
| 501 | ... | L2 |
| 502 | ... | L3 |
| 503 | ... | L4 |
| 504 | ... | L5 |
| 505 | ... | V1 |
| 506 | ... | V2 |
| . | | |
| . | | |
| . | | |
| 511 | ... | T |

As previously mentioned, the program stored in the non-volatile memory 4 has the NC program corresponding to the respective set data described by the use of the macro parameters. For example, the program uses macro parameters as follows.

```
G01Y#501, F#505
     Y#502, F#506
      .     .
      .     .
```

Note that G01 denotes a linear interpolation function, Y designates an actuating spindle, i.e., in this case, a mold clamping servo motor (not shown) for a spindle for performing mold clamping, and F represents an address for designating a feed speed. As a result, in accordance with the NC program, the CPU 2 drives the mold clamping servo motor through the input/output circuit 9 and the servo circuit 11 of the mold clamping servo motor, so that a mold (not shown) is moved to a position L2 (mold protection start position) stored at an address of macro parameter 501 at a feed speed V1 stored at an address of macro parameter 505. Similarly, in the next step, mold clamping is executed so that the mold reaches a position stored at an address of macro parameter 502, i.e., the position L3 (mold contact position), at a speed V2 stored at an address of macro parameter 506.

In this manner, the various condition values in the NC program stored in the non-volatile memory 4 for executing the respective processes are described as macro parameters, and the various condition values can be changed by the manual input unit 7 through the macro parameters.

As a result, when the operating patterns of the respective injection molding processes are the same and various conditions such as a position for operation switching or a speed are different, a desired injection molding process can be obtained simply by setting the various conditions. The NC program or original program need be changed to produce a new program only when the operating patterns of the processes are different, e.g., when the number of program stages for the injection speed is changed from three to four.

In the above embodiment, the display unit 8 is used to set the various conditions and execute macro parameter processing. However, the display unit can be omitted if the various conditions are selected and corresponding set values are input by the manual input unit 7 and stored in the non-volatile memory 4, thereby executing macro parameter processing.

I claim:

1. A method for setting operating conditions for injection molding conditions of an injection molding machine controlled by a numerical control unit having a memory storing an injection operation control program including injection operations, comprising the steps of:
    (a) providing fixed operation sequence macros for the operations in the control program, said macros included in said program;
    (b) reserving a portion of the memory for storing macro parameters for each of the macros;
    (c) entering macro parameter values for each of the operations;
    (d) storing the macro parameter values in the reserved portion of the memory; and
    (e) producing numerical control using the macros and macro parameters without altering said program and without producing a new program.

2. A method as recited in claim 1, wherein said numerical control unit includes a display, display selecting means and value entering means, and step (c) includes the steps of:
    (c1) displaying macro parameter definitions and value entry spaces corresponding to the definition on said display; and
    (c2) selecting the macro definition using said display selecting means and entering the macro parameter values for corresponding definitions using said value entering means.

* * * * *